US012689100B2

(12) United States Patent
Lee et al.

(10) Patent No.: US 12,689,100 B2
(45) Date of Patent: Jul. 21, 2026

(54) ELECTRODE TAB GUIDE APPARATUS, AND ELECTRODE TAB MANUFACTURING APPARATUS AND ELECTRODE ASSEMBLY MANUFACTURING METHOD USING THE SAME

(71) Applicant: LG ENERGY SOLUTION, LTD., Seoul (KR)

(72) Inventors: Dong Geun Lee, Daejeon (KR); Ik Joon Kim, Daejeon (KR)

(73) Assignee: LG ENERGY SOLUTION, LTD., Seoul (KR)

( * ) Notice: Subject to any disclaimer, the term of this patent is extended or adjusted under 35 U.S.C. 154(b) by 545 days.

(21) Appl. No.: 18/039,170

(22) PCT Filed: Aug. 31, 2022

(86) PCT No.: PCT/KR2022/013042
§ 371 (c)(1),
(2) Date: May 26, 2023

(87) PCT Pub. No.: WO2023/033543
PCT Pub. Date: Mar. 9, 2023

(65) Prior Publication Data
US 2024/0006725 A1      Jan. 4, 2024

(30) Foreign Application Priority Data
Sep. 2, 2021    (KR) ........................ 10-2021-0117219

(51) Int. Cl.
*H01M 4/02* (2006.01)
*H01M 50/533* (2021.01)
*H01M 50/536* (2021.01)

(52) U.S. Cl.
CPC ....... *H01M 50/533* (2021.01); *H01M 50/536* (2021.01)

(58) Field of Classification Search
CPC ............. H01M 50/533; H01M 50/536; H01M 50/534; H01M 50/538; H01M 50/54;
(Continued)

(56) References Cited

U.S. PATENT DOCUMENTS

2014/0312911 A1* 10/2014 Ding .................. H01M 10/486
324/426
2018/0269460 A1* 9/2018 Kim .................. H01M 10/0481
(Continued)

FOREIGN PATENT DOCUMENTS

CN    110052729 A    7/2019
CN    110635095 A    12/2019
(Continued)

OTHER PUBLICATIONS

"Robot end effector", Wikipedia, https://en.wikipedia.org/w/index.php?title=Robot_end_effector&oldid=1023227150, May 15, 2021, (5 pages total).
(Continued)

*Primary Examiner* — Raymond Alejandro
(74) *Attorney, Agent, or Firm* — Birch, Stewart, Kolasch & Birch, LLP

(57) ABSTRACT

An electrode tab guide apparatus configured to press and collect a plurality of electrode tabs protruding from an electrode assembly when the electrode tabs are welded by a welding part includes a first tab guide and a second tab guide configured to move toward the electrode tabs from above and below the electrode tabs, respectively, and press and collect the electrode tabs, and a mover configured to move the first tab guide and the second tab guide. The mover includes a vertical mover configured to vertically move the first tab guide and the second tab guide, and a horizontal mover configured to horizontally move at least one of the first tab guide or the second tab guide.

16 Claims, 5 Drawing Sheets

(58) Field of Classification Search
    CPC ............. H01M 50/531; H01M 50/528; H01M
                                    50/502; H01M 50/507
    See application file for complete search history.

(56)                    References Cited

U.S. PATENT DOCUMENTS

2019/0148705  A1      5/2019  Park et al.
2019/0372079  A1*    12/2019  Nakamoto ............ H01M 50/50

FOREIGN PATENT DOCUMENTS

| CN | 211455822 | U | 9/2020 |
|---|---|---|---|
| CN | 112792490 | A | 5/2021 |
| JP | 2009-187768 | A | 8/2009 |
| JP | 5797330 | B2 | 10/2015 |
| JP | 2019-207861 | A | 12/2019 |
| KR | 10-1492726 | B1 | 2/2015 |
| KR | 10-2015-0033381 | A | 4/2015 |
| KR | 10-2017-0046910 | A | 5/2017 |
| KR | 10-2018-0072065 | A | 6/2018 |
| KR | 10-2019-0054617 | A | 5/2019 |
| KR | 10-2094210 | B1 | 3/2020 |
| KR | 10-2020-0105272 | A | 9/2020 |
| WO | WO 2011/118565 | A1 | 9/2011 |
| WO | WO 2013/160932 | A1 | 10/2013 |

OTHER PUBLICATIONS

European Communication pursuant to Article 94(3) EPC for European Application No. 22 865 045.3, dated Dec. 1, 2025.
International Search Report for PCT/KR2022/013042 mailed on Dec. 7, 2022.
European Communication pursuant to Article 94(3) EPC for European Application No. 22865045.3, dated May 8, 2026.

* cited by examiner

【FIG. 1】
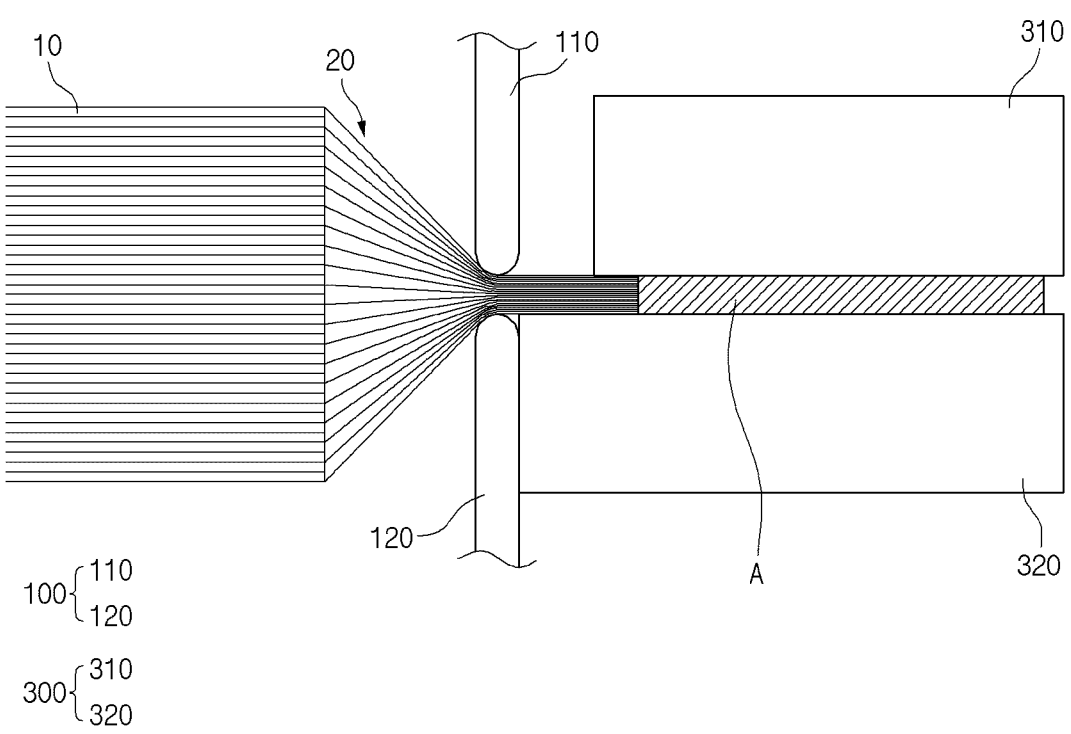
Related Art

【FIG. 2】
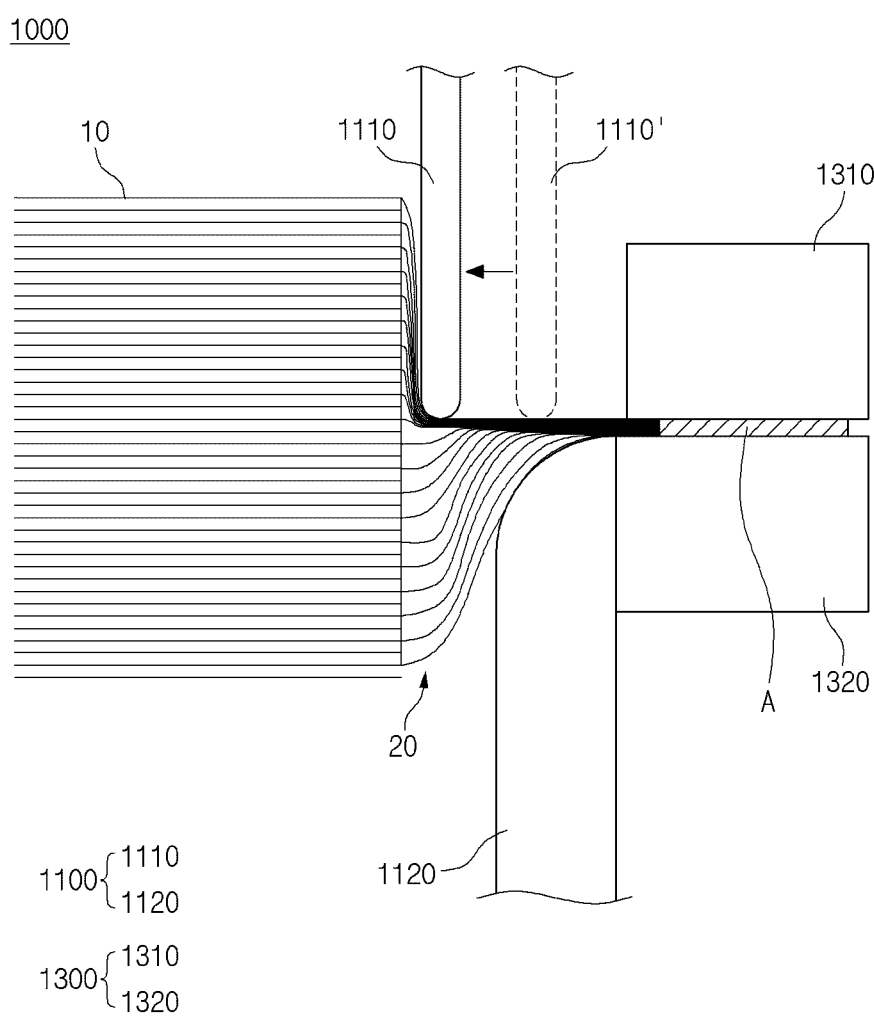

【FIG. 3】
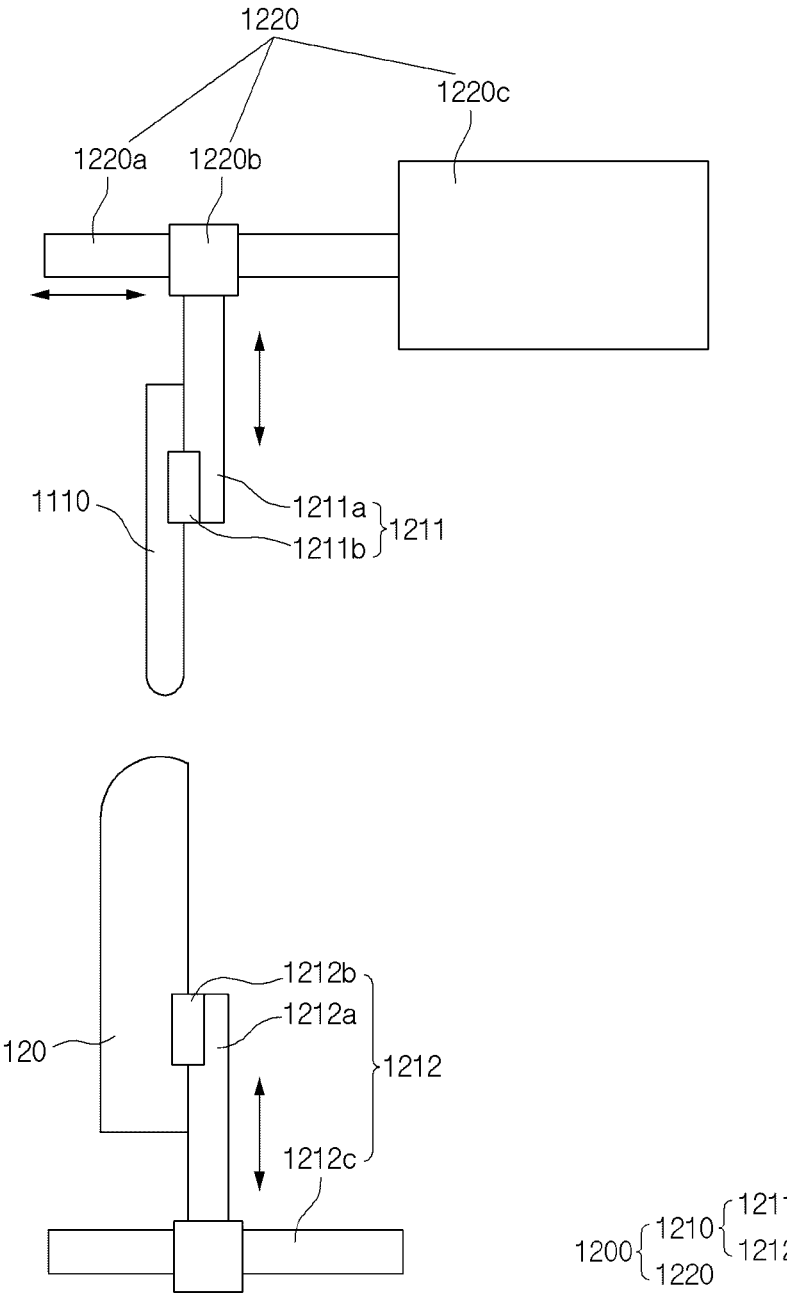

【FIG. 4】
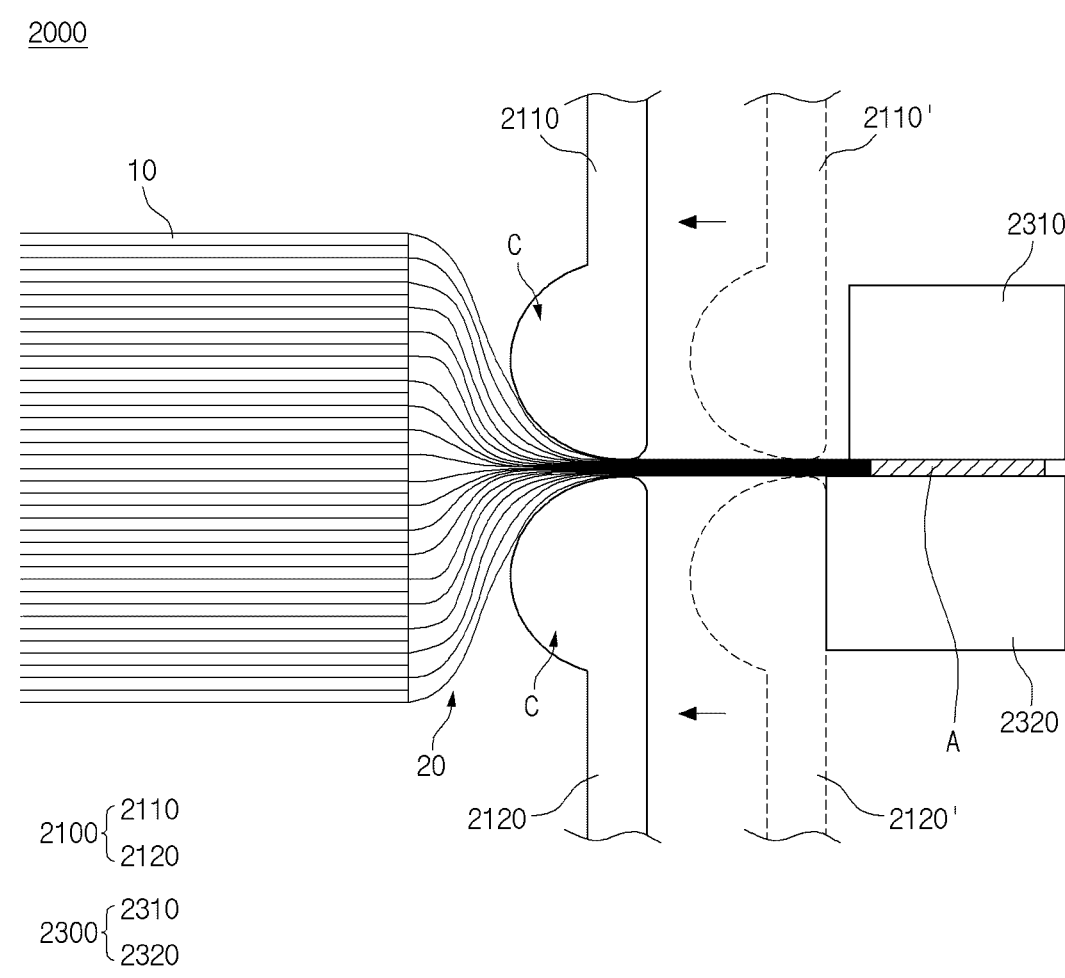

[FIG. 5]
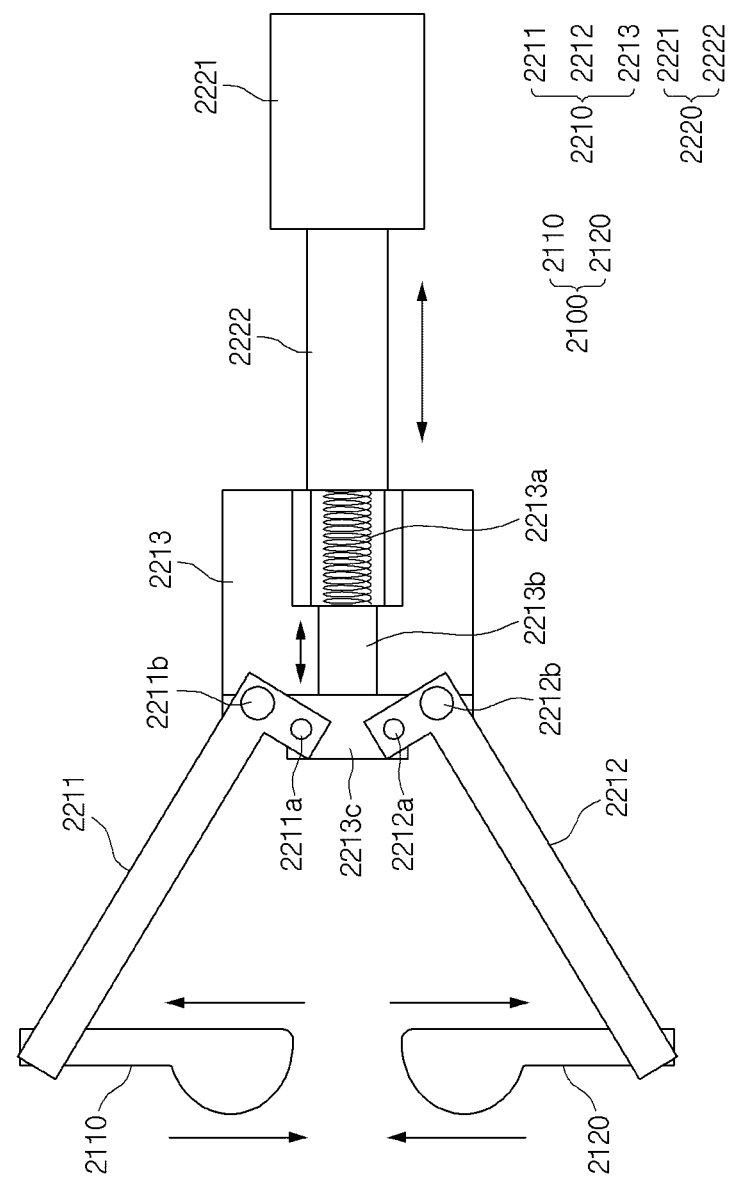

ELECTRODE TAB GUIDE APPARATUS, AND ELECTRODE TAB MANUFACTURING APPARATUS AND ELECTRODE ASSEMBLY MANUFACTURING METHOD USING THE SAME

TECHNICAL FIELD

The present invention relates to an electrode tab guide apparatus.

More particularly, the present invention relates to an electrode tab guide apparatus capable of preventing an electrode tab from being disconnected by elongating the electrode tab by horizontally moving at least one of a first tab guide and a second tab guide, which are positioned above and below the electrode tab, toward an electrode assembly.

The present invention also relates to an electrode tab manufacturing apparatus and an electrode assembly manufacturing method using the electrode tab guide apparatus.

This application claims the benefit of priority based on Korean Patent Application No. 10-2021-0117219, filed on Sep. 2, 2021, and the entire contents of the Korean patent application are incorporated herein by reference.

BACKGROUND ART

Recently, secondary batteries capable of charging and discharging have been widely used as energy sources of wireless mobile devices. In addition, the secondary battery has attracted attention as an energy source of an electric vehicle, a hybrid electric vehicle, and the like, which are proposed as a solution for air pollution of existing gasoline vehicles and diesel vehicles using fossil fuel. Accordingly, the types of applications using the secondary battery are currently much diversified due to the advantages of the secondary battery, and it is expected that the secondary battery will be applied to many fields and products in the future.

Such secondary batteries may be classified into lithium ion batteries, lithium-ion polymer batteries, lithium polymer batteries, and the like depending on the composition of an electrode and an electrolyte, and among them, the amount of use of lithium-ion polymer batteries that are less likely to leak an electrolyte and are easy to manufacture is on the increase.

In general, secondary batteries are classified into cylindrical batteries and prismatic batteries in which an electrode assembly is embedded in a cylindrical or prismatic metal can, depending on the shape of a battery case, and pouch-type batteries in which the electrode assembly is embedded in a pouch-type case of an aluminum laminate sheet. The electrode assembly embedded in the battery case is composed of a positive electrode, a negative electrode, and a separator interposed between the positive electrode and the negative electrode, and is a power generating element capable of charging and discharging. The electrode assembly is classified into a jelly-roll type wound with a separator interposed between a positive electrode and a negative electrode which are long sheet-shaped and are coated with an active material, and a stack type in which a plurality of positive electrodes and negative electrodes of a predetermined size are sequentially stacked in a state in which a separator is interposed therebetween.

FIG. 1 illustrates an electrode tab manufacturing apparatus according to the related art.

Referring to FIG. 1, in an electrode assembly 10, electrode tabs 20 provided at end portions of a plurality of electrodes are collected and welded and connected to an electrode lead. When the electrode assembly is accommodated and sealed in a battery case, the electrode assembly may be electrically connected to the outside through the electrode lead. Before the electrode tabs are welded to the electrode lead, the electrode tabs are collected and subjected to a pre-welding process by a horn and an anvil. At this time, there is a problem in which external dust is introduced in a direction of the electrode assembly during the pre-welding process to deteriorate the quality of the electrode assembly. In order to prevent this, as shown in FIG. 1, a plurality of electrode tabs 20 are pressed and collected by tab guides 110 and 120, which are positioned above and below the electrode tabs 20 and each of which has a shape of a straight bar, to form an electrode tab stack. Subsequently, an anvil 320 supports a welding target portion A, and a horn 310 applies ultrasonic vibration to the welding target portion A to weld the electrode tabs 20. Thereafter, the electrode assembly is manufactured by welding the electrode lead (not shown) to an upper portion or a lower portion of the welding target portion A in which the electrode tabs 20 are welded.

As the tab guides 110 and 120 having a straight rod shape come into contact with the electrode tabs 20, a predetermined pressure is applied to the electrode tabs 20, and thus the electrode tabs 20 are elongated. However, the elongating of the electrode tab is limited depending on models, and thus a length margin rate of an outermost tab (a straight length of the outermost tab due to the tab guide/a tab length of a swelled cell) is generally low. In this case, when a tensile force is applied due to a post-welding process, a tab disconnection defect is likely to occur. In order to prevent this, the electrode tab needs to be elongated longer and welded. However, the conventional tab guide moves only up and down, and thus, when the electrode tab is pressed by the electrode tab guide, there was a lint in that an elongated length could not be increased more than a certain length.

Accordingly, there is a need to develop a technology capable of reducing the tab disconnection due to the tensile force by making the length of the outermost electrode tab longer during the pre-welding process.

PRIOR-ART DOCUMENTS

Patent Documents

Korean Patent Publication No. 10-2019-0054617

DISCLOSURE

Technical Problem

The present invention has been devised to solve the above problem, and the present invention is directed to providing an electrode tab guide apparatus capable of preventing a tab disconnection caused by pre-welding.

The present invention is also directed to providing an electrode tab manufacturing apparatus including the electrode tab guide apparatus.

The present invention is also directed to providing an electrode assembly manufacturing method capable of welding an electrode tab by increasing a length of the electrode tab.

Technical Solution

An electrode tab guide apparatus according to the present invention for solving the above problems is an electrode tab guide apparatus configured to press and collect a plurality of electrode tabs protruding from an electrode assembly when the electrode tabs are welded by a welding part, and includes a first tab guide and a second tab guide configured to move toward the electrode tabs from above and below the electrode tabs, respectively, and to press and collect the electrode tabs, and a mover configured to move the first tab guide and the second tab guide, wherein the mover includes a vertical mover configured to vertically move the first tab guide and the second tab guide, and a horizontal mover configured to horizontally move at least one of the first tab guide or the second tab guide.

As one example, the vertical mover may include a first elevating member configured to move the first tab guide up and down and a second elevating means-member configured to move the second tab guide up and down.

As another example, the vertical mover may be configured to simultaneously perform a raising of the first tab guide and a lowering of the second tab guide, and to simultaneously perform a lowering of the first tab guide and a raising of the second tab guide.

Specifically, the vertical mover may be an air chuck cylinder.

In more detail, the air chuck cylinder may include a first cantilever arm and a second cantilever arm, which rotate to be close to and spaced apart from each other by adjusting an air pressure at an end portions thereof, and the first tab guide and the second tab guide are coupled to the first and second cantilever arms, respectively.

As a specific example, the vertical mover may be coupled to the horizontal mover, and the at least one of the first tab guide or the second tab guide may be configured to be horizontally moved toward the electrode assembly when the first tab guide is lowered and the second tab guide is raised by the vertical mover to press the electrode tabs.

As one example, the horizontal mover may include a driving part and a linear mover, wherein the vertical mover may be coupled to an end portion of the linear mover.

As one example, each of the first tab guide and the second tab guide may have a curved surface on an end portion pressing surface configured to be brought into contact with the electrode tabs.

As another example, each of the first tab guide and the second tab guide may have a protrusion protruding in one direction from an end portion pressing surface in configured to be brought into contact with the electrode tabs.

As another example, in the horizontal direction, a width of the second tab guide may be greater than a width of the first tab guide, and an area of a pressing surface of the second tab guide may be greater than an area of a pressing surface of the first tab guide.

An electrode tab manufacturing apparatus according to another aspect of the present invention is an electrode tab manufacturing apparatus for an electrode assembly in which a plurality of electrode tabs protrude from at least one side of the electrode assembly, and includes a tab guide part including a first tab guide and a second tab guide configured to move toward the electrode tabs from above and below the electrode tabs, respectively, and to press and collect the electrode tabs, a mover configured to move the first tab guide and the second tab guide, and a welding part configured to weld the collected electrode tabs, wherein the mover includes a vertical mover configured to vertically move the first tab guide and the second tab guide, and a horizontal mover configured to horizontally move at least one of the first tab guide or the second tab guide.

As one example, the tab guide part may be positionable between the electrode assembly and the welding part.

As one example, the welding part may be an ultrasonic welding part having a horn and an anvil.

Specifically, the vertical mover may be coupled to the horizontal mover, and the at least one of the first and tab guide or the second tab guide may be configured to be horizontally moved toward the electrode assembly when the first tab guide is lowered and the second tab guide is raised by the vertical mover to press the electrode tabs.

An electrode assembly manufacturing method according to still another aspect of the present invention is a method of manufacturing an electrode assembly in which a plurality of electrode tabs protrude from at least one side of the electrode assembly, and includes positioning a welding target portion of the electrode tabs on a welding part, pressing the electrode tab tabs by moving a first tab guide and a second tab guide from above and below of the electrode tabs, respectively, toward the electrode tabs, and elongating at least one of the electrode tabs by horizontally moving at least one of the first and tab guide or the second tab guide toward the electrode assembly in a state in which the welding target portion of the electrode tabs is fixed to the welding part.

The electrode assembly manufacturing method may further include welding the electrode tabs in a state in which the at least one of the electrode tabs is elongated.

Advantageous Effects

According to the present invention, an electrode assembly having improved durability against a tab disconnection can be manufactured by allowing electrode tabs to be elongated much longer than conventional electrode tabs by configuring an electrode tab guide to horizontally move toward the electrode assembly during a pre-welding process of welding the electrode tabs to each other.

BRIEF DESCRIPTION OF THE DRAWINGS

FIG. 1 illustrates an electrode tab manufacturing apparatus according to the related art.

FIG. 2 is a schematic view illustrating an electrode tab manufacturing apparatus according to one embodiment of the present invention.

FIG. 3 is a schematic view illustrating an electrode tab guide apparatus according to one embodiment of the present invention.

FIG. 4 is a schematic view illustrating an electrode tab manufacturing apparatus according to another embodiment of the present invention.

FIG. 5 is a schematic view illustrating an electrode tab guide apparatus according to still another embodiment of the present invention.

DETAILED DESCRIPTION OF THE PREFERRED EMBODIMENTS

Hereinafter, the present invention will be described in detail. Prior to this, terms or words used in the present specification and claims should not be restrictively interpreted as ordinary meanings or dictionary-based meanings, but should be interpreted as meanings and concepts consistent with the technical ideas of the present invention on the basis of the principle that an inventor can properly define the concept of a term to describe and explain his or her invention in the best way.

Throughout this specification, it should be understood that terms such as "include" or "have" are intended to indicate that there is a feature, number, step, operation, component, part, or a combination thereof described on the specification, and they do not exclude in advance the possibility of the presence or addition of one or more other features or numbers, steps, operations, components, parts or combinations thereof.

Also, when a portion such as a layer, a film, an area, a plate, or the like is referred to as being "on" another portion, this includes not only the case in which the portion is "directly on" the another portion but also the case in which still another portion is interposed therebetween. In contrast, when a portion such as a layer, a film, an area, a plate, or the like is referred to as being "below" another portion, this includes not only the case in which the portion is "directly below" the another portion but also the case in which still another portion is interposed therebetween. In addition, to be disposed "on" in the specification of the present disclosure may include the case disposed at the lower portion as well as the upper portion.

Meanwhile, in the present application, a "horizontal direction" refers to a direction in which an electrode tab is withdrawn, and a "vertical direction" refers to a direction perpendicular to the horizontal direction.

An electrode tab guide apparatus according to the present invention is an electrode tab guide apparatus configured to press and collect a plurality of electrode tabs protruding from an electrode assembly when the electrode tabs are welded by a welding part, and includes a first tab guide and a second tab guide configured to move toward the electrode tabs from above and below the electrode tabs and press and collect the electrode tabs, and a moving means configured to move the first and second tab guides, wherein the moving means includes a vertical moving means configured to vertically move the first and second tab guides, and a horizontal moving means configured to horizontally move at least one of the first and second tab guides.

As described above, in the case of pressing the electrode tabs with a straight bar-shaped tab guide during a conventional pre-welding process, there is a limit to the elongation of the electrode tabs.

Accordingly, in the present invention, by allo-wing the electrode tabs to be elongated longer by horizontally moving at least one of the first tab guide and the second tab guide toward the electrode assembly, durability against a tab disconnection can be improved. Specifically, when the electrode tabs are elongated, tension applied to the electrode tabs adjacent to the electrode assembly may be mitigated, so that the possibility of the tab disconnection due to an external impact may be reduced. In addition, when end portions of the electrode tabs are welded, the applied load is not directly transmitted to the electrode tabs adjacent to the electrode, so that the risk of disconnection is greatly reduced. In addition, even when tensile force is applied due to a post-welding process, a tab disconnection defect may be prevented.

The above-described configuration of the present invention will be described in more detail with reference to the accompanying drawings and embodiments. In describing each drawing, similar reference numerals are used for similar components. In the accompanying drawings, the dimensions of structures are shown in an enlarged scale for clarity of the present invention. Terms such as "first" and "second" may be used to describe various components, but the components should not be limited by the terms. The terms are used only for the purpose of distinguishing one component from another. For example, without departing from the scope of the present invention, a first component may be referred to as a second component, and similarly, the second component may also be referred to as the first component. Singular expressions include plural expressions unless the context clearly indicates otherwise.

Hereinafter, the present invention will be described in detail.

First Embodiment

FIG. 2 is a schematic view illustrating an electrode tab manufacturing apparatus 1000 according to one embodiment of the present invention.

The electrode tab manufacturing apparatus 1000 of the present embodiment is an electrode tab manufacturing apparatus for an electrode assembly 10 in which a plurality of electrode tabs 20 protrude from at least one side of the electrode assembly 10 and includes: a tab guide part 1100 including a first tab guide 1110 and a second tab guide 1120 configured to move toward the electrode tabs 20 from above and below the electrode tabs 20 and press and collect the electrode tabs 20, and a moving means configured to move the first tab guide 1110 and the second tab guide 1120; and a welding part 1300 configured to weld the collected electrode tabs, wherein the moving means includes a vertical moving means 1210 configured to vertically move the first tab guide 1110 and the second tab guide 1120 and a horizontal moving means 1220 configured to horizontally move at least one of the first tab guide 1110 and the second tab guide 1120.

The tab guide part 1100 is positioned between the electrode assembly 10 and the welding part 1300 and serves to press and elongate the electrode tabs 20 before the electrode tabs 20 are welded.

The welding part 1300 is an ultrasonic welding part that ultrasonically welds the electrode tabs 20 using a horn 1310 and an anvil 1320. That is, the welding part 1300 is positioned farther from the electrode assembly 10 than the tab guide part 1100 and serves to weld an end portion of each of the electrode tabs 20. Specifically, the welding part 1300 includes the anvil 1320 having an upper surface on which the electrode tabs 20 are mounted, and the horn 1310 positioned above the electrode tabs 20 and configured to move downward and apply ultrasonic waves in a state in which the electrode tabs 20 positioned on the upper surface of the anvil 1320 are pressed. Specifically, the horn 1310 serves to apply ultrasonic vibration to the electrode tabs 20 to weld the electrode tabs 20, and the anvil 1320 serves to support the electrode tabs 20 so that vibration energy due to the ultrasonic waves can be effectively transferred to the electrode tabs 20 by maintaining the pressure delivered to the electrode tabs 20.

FIG. 2 illustrates the first tab guide 1110 and the second tab guide 1120 that move toward the electrode tabs 20 from above and below the electrode tabs 20, and press and collect the electrode tabs 20. That is, with respect to the electrode tabs 20, the first tab guide 1110 corresponds to an upper tab guide and the second tab guide 1120 corresponds to a lower tab guide. The first and second tab guides 1110 and 1120 may include the vertical moving means 1210 and thus can move vertically and press the electrode tabs 20. In initial positions, the first and second tab guides 1110 and 1120 are disposed to vertically face each other with the electrode tabs 20 interposed therebetween.

In the present embodiment, the first tab guide 1110 is configured to be movable horizontally in addition to moving vertically. The second tab guide 1120 can move only vertically. When the vertical moving means 1210 lowers the first tab guide 1110 and raises the second tab guide 1120, respectively, as illustrated by a dotted line in FIG. 2, the electrode tabs 20 may be pressed by the first tab guide 1110 and the second tab guide 1120 in a state of being sandwiched therebetween. Conventionally, the first and second tab guides move only up and down, and thus, there is a limit in an elongated length of the electrode tab.

However, in the present invention, the first tab guide 1110 is configured to move horizontally toward the electrode assembly 10 in a state in which the first tab guide 1110 is lowered. Accordingly, as shown in FIG. 2, it can be seen that a length of the electrode tab pressed by the first tab guide 1110 is greatly elongated. That is, it can be seen that an elongated length of the electrode tabs 20 due to the first tab guide 1110 thereabove is greater than an elongated length of the electrode tabs 20 due to the second tab guide 1120 therebelow. As described above, the tab guide moving means of the present embodiment includes the vertical moving means configured to vertically move the first and second tab guides 1110 and 1120, and the horizontal moving means configured to horizontally move the first tab guide 1110.

FIG. 3 is a schematic view of an electrode tab guide apparatus according to one embodiment of the present invention.

Referring to FIG. 3, the electrode tab guide apparatus according to the present invention is an electrode tab guide apparatus configured to press and collect a plurality of electrode tabs protruding from an electrode assembly when the electrode tabs are welded by a welding part, and includes a first tab guide 1110 and a second tab guide 1120 which move toward the electrode tabs from above and below the electrode tabs and press and collect the electrode tabs, and a moving means 1200 configured to move the first tab guide 1110 and the second tab guide 1120. The moving means 1200 includes a vertical moving means 1210 configured to vertically move the first tab guide 1110 and the second tab guide 1120, and a horizontal moving means 1220 configured to horizontally move at least one of the first tab guide 1110 and the second tab guide 1120. In the present embodiment, only the first tab guide 1110 is configured to move vertically and horizontally.

Referring to FIG. 3, the first tab guide 1110 includes both a vertical moving means 1211 that is vertically movable and the horizontal moving means 1220 that is horizontally movable. The horizontal moving means 1220 may include a ball screw shaft 1220a connected to a driving part 1220c, which is, for example, a servo-motor, and a horizontal guide block 1220b that moves along the ball screw shaft 1220a. The vertical moving means 1211 may be composed of a pneumatic or hydraulic cylinder 1211a coupled to the horizontal guide block 1220b and a vertical guide block 1211b coupled to an end portion of the cylinder 1211a. The first tab guide 1110 installed above the electrode tabs 20 is attached to the vertical guide block 1211b.

On the other hand, the second tab guide 1120 includes only a vertical moving means 1212 that is vertically movable. The vertical moving means 1212 includes a pneumatic or hydraulic cylinder 1212a installed on a support 1212c, and a vertical guide block 1212b that is elevated according to the movement of the pneumatic or hydraulic cylinder 1212a. The second tab guide 1120 installed below electrode tabs 20 is attached to the vertical guide block 1212b.

In the present embodiment, a two-axis transfer mechanism as described above has been described as an example, but other configurations in which reciprocating translational motion is possible in each of vertical and horizontal directions can be employed. In addition, it will be apparent to those skilled in the art that a driving part, such as a linear motor, and a control part for controlling the movement of the driving part are included when performing such a motion.

Further, the two-axis transfer mechanism can be realized by using a linear motion (LM) guide or a numerically controlled track and a thermo-motor instead of using a ball screw or a cylinder, and employing a linear moving means having various well-known mechanical structures such as a belt and a bearing interworking therewith, and this is a known mechanical coupling method, and thus a further detailed description thereof will be omitted.

When pressing the electrode tabs 20, the vertical moving means 1210 serves to bring the tab guides closer to the electrode tabs, and when the welding process is finished, the vertical moving means 1210 serves to separate the tab guides from the electrode tabs 20. Specifically, when the electrode tabs 20 are pressed, the vertical moving means 1211 attached to the first tab guide 1110 lowers the first tab guide 1110 toward the electrode tabs 20, and the vertical moving means 1212 attached to the second tab guide 1120 raises the second tab guide 1120 toward the electrode tabs 20. On the other hand, when the welding process is finished, so as to be spaced apart from the electrode tabs 20, the vertical moving means 1211 attached to the first tab guide 1110 raises the first tab guide 1110 from the electrode tabs 20, and the vertical moving means 1212 attached to the second tab guide 1120 lowers the second tab guide 1120 from the electrode tabs 20.

The horizontal moving means 1220 serves to elongate the electrode tabs 20 by horizontally moving the first tab guide 1110 toward the electrode assembly 10. In this case, according to the standard of the electrode assembly 10 to be manufactured, a horizontally moving distance may be determined to be within an appropriate range. For example, the distance may be in a range of 0.5 to 2 mm.

Meanwhile, when the first tab guide 1110 moves horizontally, the first tab guide 1110 may move while maintaining a constant vertical separation distance between the first tab guide 1110 and the second tab guide 1120. For example, a separation distance in the vertical direction may be in a range of 0.5 to 1.5 mm. When the distance is less than 0.5 mm, excessive pressure may be applied to the electrode tabs to cause disconnection, and when the distance is greater than 1.5 mm, the electrode tabs may not be sufficiently elongated.

As shown in FIG. 2, each of the first tab guide 1110 and the second tab guide 1120 has a curved surface formed on a pressing surface in contact with the electrode tabs 20. Accordingly, when the first tab guide 1110 and the second tab guide 1120 press the electrode tabs 20 by coming into contact therewith, there is less risk of disconnection as compared to a case of a rod shape, and thus the electrode tabs 20 can be effectively elongated.

Further, as shown in FIG. 2, the first tab guide 1110 and the second tab guide 1120 are different from each other in a length in a width direction and an area of the pressing surface in contact with the electrode tabs 20. Specifically, the area of the pressing surface of the second tab guide 1120 positioned below the electrode tabs 20 may be greater than that of the first tab guide 1110, and the length in the width direction of the second tab guide 1120 may be greater than that of the first tab guide 1110. By configuring the length in the width direction or the area of the pressing surface of the second tab guide 1120 to be greater than that of the first tab guide 1110, the second tab guide 1120 can stably support the electrode tabs 20 when the first tab guide 1110 moves horizontally.

Second Embodiment

FIG. 4 is a cross-sectional view illustrating an electrode tab manufacturing apparatus 2000 according to a second embodiment of the present invention.

The electrode tab manufacturing apparatus 2000 of the present embodiment is different from that of the first embodiment in that each of a first tab guide 2110 and a second tab guide 2120 has a convex portion C that protrudes to one side from a pressing surface thereof in contact with the electrode tabs 20, and the first tab guide 2110 and the second tab guide 2120 move horizontally toward the electrode assembly 10 at the same time. In the second embodiment, the components common to the first embodiment are denoted by the same reference numerals, and detailed descriptions thereof will be omitted.

As shown in FIG. 4, each of the first tab guide 2110 and the second tab guide 2120 has the convex portion C, which protrudes to one side, at the pressing surface thereof in contact with the electrode tabs 20. Specifically, since the convex portion C protrudes in a direction toward the electrode assembly, the electrode tabs 20 may be more effectively elongated when the first tab guide 2110 and the second tab guide 2120 move horizontally.

Further, the first tab guide 2110 and the second tab guide 2120 simultaneously move in the horizontal direction. Specifically, the first tab guide 2110 and the second tab guide 2120 move horizontally toward the electrode assembly 10 while maintaining positions facing each other, and elongate the electrode tabs 20. That is, by the horizontal movement, both the first tab guide 2110 and the second tab guide 2120 are positioned closer to the electrode assembly 10. Accordingly, the lower electrode tab 20 may also be elongated to be long, thereby effectively improving an outermost tab length margin rate.

In the present embodiment, the first and second tab guides 2110 and 2120 vertically move downward and upward, respectively, and then, move horizontally. In this case, the horizontal moving means 1220 as shown in FIG. 3 may be installed in each of the upper first tab guide 2110 and the second tab guide 2120. In this case, since the first and second tab guides 2110 and 2120 need to move toward the electrode assembly 10 at the same time, the horizontal moving means of the first and second tab guides 2110 and 2120 may operate synchronously.

Third Embodiment

FIG. 5 is a schematic view illustrating an electrode tab guide apparatus according to still another embodiment of the present invention.

As shown in FIG. 3, when separate vertical moving means 1211 and 1212 are coupled to the first and second tab guides 1110 and 1120, respectively, it is difficult to raise and lower each tab guide in the same manner. In addition, two elevating members and two driving parts are required for the horizontal movement of the first and second tab guides.

In the present embodiment, a vertical moving means 2210 is configured such that a raising of the first tab guide 2110 and a lowering of the second tab guide 2120 are performed at the same time, and a lowering of the first tab guide 2110 and a raising of the second tab guide 2120 are performed at the same time.

The vertical moving means 2210 of the present embodiment is an air chuck cylinder.

The air chuck cylinder 2210 includes first and second cantilever arms 2211 and 2212 configured to rotate to be close to and spaced apart from each other by an air pressure at end portions thereof. First and second tab guides 2110 and 2120 are respectively coupled to the other end portions of the cantilever arms 2211 and 2212 of the air chuck cylinder 2210. Accordingly, as indicated by arrows in FIG. 5, as the cantilever arms 2211 and 2212 rotate, the raising of the first tab guide 2110 and the lowering of the second tab guide 2120 are performed at the same time, and the lowering of the first tab guide 2110 and the raising of the second tab guide 2120 are performed at the same time.

Specifically, the air chuck cylinder 2210 includes a piston rod 2213*b* supported by an elastic member 2213*a* positioned therein and moving forward against an elastic force of the elastic member 2213*a* caused by an air pressure applied into a cylinder body 2213, and a movable member 2213*c* mounted on a front end portion of the piston rod 2213*b*. One end portion of each of the first and second cantilever arms 2211 and 2212 is hinge-coupled to the movable member 2213*c*. First hinge coupling parts 221*a* and 2212*a* coupled to the movable member 2213*c* and second hinge coupling parts 2211*b* and 2212*b* coupled to the air chuck cylinder body 2213 are provided at one end portions of the first and second cantilever anus 2211 and 2212, respectively. When the air pressure is applied into the air chuck cylinder body 2213, the piston rod 2213*b* and the movable member 2213*c* mounted thereon move forward, and accordingly, the first hinge coupling parts 2211*a* and 2212*a* of the first and second cantilever arms 2211 and 2212 move forward, Since the first and second hinge coupling parts 2211*a* and 2211*b* and 2212*a* and 2212*b* are positioned at one end portions of the first and second cantilever arms 2211 and 2212, respectively, one end portions of the first and second cantilever arms 2211 and 2212 rotate about the first and second hinge coupling parts 2211*a* and 2211*b* and 2212*a* and 2212*b*, respectively, by the forward force of the first hinge coupling parts 2211*a* and 2212*a*. Accordingly the first and second cantilever arms 2211 and 2212 rotate vertically about the second hinge coupling parts 2211*b* and 2212*b*, respectively, and the other end portions of the first and second cantilever arms 2211 and 2212 rotate to be spaced apart from each other. Accordingly, the first and second tab guides 2110 and 2120 coupled to the other end portions of the first and second cantilever arms 2211 and 2212 move away from each other.

When the air pressure is removed, the elastic force of the elastic member 2213*a* acts so that the first and second cantilever arms 2211 and 2212 rotate in opposite directions about the first and second hinge coupling parts 2211*a* and 2211*b* and 2212*a* and 2212*b*, respectively. In this case, the first and second tab guides 2110 and 2120 attached to the other end portions of the first and second cantilever arms 2211 and 2212 approach each other.

Here, the air chuck cylinder body 2213 may be coupled to a linear moving mechanism 2222 such as a ball screw described above, and may move in the horizontal direction by a driving part 2221.

According to the present embodiment, the vertical movements of the first and second tab guides 2110 and 2120 may be synchronized and the operation of pressing the electrode tabs may be performed more simply.

Further, the present invention provides an electrode assembly manufacturing method. Hereinafter, the electrode assembly manufacturing method of the present invention will be described in detail with reference to FIG. 4.

The electrode assembly manufacturing method of the present invention is a method of manufacturing an electrode assembly 10 in which a plurality of electrode tabs 20 protrude from at least one side of the electrode assembly 10, and includes positioning a welding target portion A of the electrode tabs 20 on a welding part 2300, pressing the electrode tabs 20 by moving a first tab guide 2110 and a second tab guide 2120 from above and below the electrode tabs 20 at original positions 2110' and 2120' toward the electrode tabs 20, and elongating the electrode tabs 20 by horizontally moving the first and second tab guides 2110 and 2120 from original positions 2110' and 2120' toward the electrode assembly in a state in which the welding target portion A of the electrode tabs 20 is fixed to the welding part 2300.

In FIG. 4, the welding target portion A of the electrode tabs 20 may be positioned on an anvil 2320. In this case, the anvil 2320 may be installed to be liftable, and for welding, the anvil 2320 may be raised so that the electrode tabs 20 are positioned on the anvil 2320.

Thereafter, the first and second tab guides 2110 and 2120 move toward the electrode tabs 20 from above and below the electrode tabs 20 to press the electrode tabs 20. The vertical movement of the first and second tab guides 2110 and 2120 may be performed by a vertical moving means as described above. In this case, welding by the welding part 2300 is not yet started.

Next, in a state in which the welding target portion A of the electrode tabs 20 is fixed to the welding part 2300, the first and second tab guides 2110 and 2120 move horizontally toward the electrode assembly 10 to elongate the electrode tabs 20. The welding target portion A is fixed to the welding part 2300 before the horizontal movement because the position of the welding target portion A positioned in the welding part 2300 is displaced when end portions of the electrode tabs 20 are not fixed when the first and second tab guides 2110 and 2120 are moved toward the electrode assembly 10 by the horizontal moving means. Thai is, a horn 2310 is lowered on the anvil 2320 so that the welding target portion A is pressed between the horn 2310 and the anvil 2320. As described above, in a state in which the welding target portion A is fixed, one of the first and second tab guides (see FIG. 2) or both guides (see FIG. 4) move toward the electrode assembly 10. Accordingly, the electrode tabs 20 of the electrode assembly 10 are elongated longer than that of the related art.

Thereafter, in a state in which the electrode tabs 20 are elongated, the electrode tabs 20 may be welded by the welding part 2300.

In addition, after the elongating of the electrode tabs 20, the electrode assembly manufacturing method may further include returning the first tab guide 2110 and the second tab guide 2120 to their original positions 2110' and 2120', raising the horn 2310 to be spaced apart from the electrode tabs 20, raising and lowering the first tab guide 2110 and the second tab guide 2120, respectively, so that the first tab guide 2110 and the second tab guide 2120 are spaced apart from the electrode tabs 20, and lowering the anvil 2320 to be spaced apart from the electrode tabs 20.

The above description is only an example describing the technical spirit of the present invention, and it will be understood by those of skilled in the art that various changes in form and details may be made without departing from the spirit and scope of the present invention. Accordingly, the drawings disclosed herein are considered to be descriptive and not restrictive of the technical spirit of the present invention, and the scope of the technical spirit of the present invention is not limited by these drawings. The scope of the present invention should be construed by the appended claims along with the full range of equivalents to which such claims are entitled.

Meanwhile, in the present specification, terms indicating directions such as "up," "down," "left.", "right," "front," and "rear" are used, but these terms are only for convenience of description, and it will be obvious to those skilled in the art that these terms may vary depending on positions of an object, positions of an observer, or the like.

DESCRIPTION OF REFERENCE NUMERALS

10: electrode assembly
20: electrode tab
100: tab guide
110: first tab guide
120: second tab guide
300: welding part
310: horn
320: anvil
1000: electrode tab manufacturing apparatus
1100: tab guide part
1110: first tab guide
1120: second tab guide
1200: moving means
1210: vertical moving means
1211: first vertical moving means
1211*a*: pneumatic or hydraulic cylinder
1211*b*: vertical guide block
1212: second vertical moving means
1212*a*: pneumatic or hydraulic cylinder
1212*b*: vertical guide block
1212*c*: support
1220: horizontal moving means
1220*a*: ball screw shaft
1220*b*: horizontal guide block
1220*c*: driving part
1300: welding part
1310: horn
1320: anvil
2000: electrode tab manufacturing apparatus
2100: tab guide
2110: first tab guide
2120: second tab guide
2200: moving means
2210: vertical moving means (air chuck cylinder)
2211: first cantilever arm
2212: second cantilever arm
2211*a* and 2212*a*: first hinge coupling parts
2211*b* and 2212*b*: second hinge coupling parts
2213: air chuck cylinder body
2213*a*: elastic member
2213*b*: piston rod
2213*c*: movable member
2220: horizontal moving means
2221: driving part
2222: linear movement mechanism
2300: welding part
2310: horn
2320: anvil
A: welding target portion
C: convex portion

The invention claimed is:
1. An electrode tab guide apparatus configured to press and collect a plurality of electrode tabs protruding from an electrode assembly when the electrode tabs are welded by a welding part, the electrode tab guide apparatus comprising:

a first tab guide and a second tab guide configured to move toward the electrode tabs from above and below the electrode tabs, respectively, and to press and collect the electrode tabs; and a mover configured to move the first tab guide and the second tab guide, wherein the mover includes a vertical mover configured to vertically move the first tab guide and the second tab guide, and a horizontal mover configured to horizontally move at least one of the first tab guide or the second tab guide.

2. The electrode tab guide apparatus of claim 1, wherein the vertical mover includes a first elevating member configured to move the first tab guide up and down and a second elevating member configured to move the second tab guide up and down.

3. The electrode tab guide apparatus of claim 1, wherein the vertical mover is configured to simultaneously perform a raising of the first tab guide and a lowering of the second tab guide, and to simultaneously perform a lowering of the first tab guide and a raising of the second tab guide.

4. The electrode tab guide apparatus of claim 3, wherein the vertical mover is an air chuck cylinder.

5. The electrode tab guide apparatus of claim 4, wherein the air chuck cylinder includes a first cantilever arm and a second cantilever arm, which are configured to rotate to be close to and spaced apart from each other by adjusting an air pressure at end portions thereof, and wherein the first tab guide and the second tab guide are coupled to the first and second cantilever arms, respectively.

6. The electrode tab guide apparatus of claim 1, wherein the vertical mover is coupled to the horizontal mover, and the at least one of the first tab guide or the second tab guide is configured to be horizontally moved toward the electrode assembly when the first tab guide is lowered and the second tab guide is raised by the vertical mover to press the electrode tabs.

7. The electrode tab guide apparatus of claim 1, wherein the horizontal mover includes a driving part and a linear mover, and wherein the vertical mover is coupled to an end portion of the linear mover.

8. The electrode tab guide apparatus of claim 1, wherein each of the first tab guide and the second tab guide has a curved surface formed on an end portion pressing surface in configured to be brought into contact with the electrode tabs.

9. The electrode tab guide apparatus of claim 1, wherein each of the first tab guide and the second tab guide has a protrusion protruding in one direction from an end portion pressing surface configured to be brought into contact with the electrode tabs.

10. The electrode tab guide apparatus of claim 1, wherein, in the horizontal direction, a width of the second tab guide is greater than a width of the first tab guide, and wherein an area of a pressing surface of the second tab guide is greater than an area of a pressing surface of the first tab guide.

11. An electrode tab manufacturing apparatus for an electrode assembly in which a plurality of electrode tabs protrude from at least one side of the electrode assembly, the electrode tab manufacturing apparatus comprising:

a tab guide part including a first tab guide and a second tab guide configured to move toward the electrode tabs from above and below the electrode tabs, respectively, and to press and collect the electrode tabs;

a mover configured to move the first tab guide and the second tab guide; and a welding part configured to weld the collected electrode tabs, wherein the mover includes a vertical mover configured to vertically move the first tab guide and the second tab guide, and a horizontal mover configured to horizontally move at least one of the first tab guide or the second tab guide.

12. The electrode tab manufacturing apparatus of claim 11, wherein the tab guide part is positioned-positionable between the electrode assembly and the welding part.

13. The electrode tab manufacturing apparatus of claim 11, wherein the welding part is an ultrasonic welding part having a horn and an anvil.

14. The electrode tab manufacturing apparatus of claim 11, wherein the vertical mover is coupled to the horizontal mover, and the at least one of the first tab guide or the second tab guide is configured to be horizontally moved toward the electrode assembly when the first tab guide is lowered and the second tab guide is raised by the vertical mover to press the electrode tabs.

15. A method of manufacturing an electrode assembly in which a plurality of electrode tabs protrude from at least one side of the electrode assembly, the method comprising:

positioning a welding target portion of the electrode tabs on a welding part;

pressing the electrode tabs by moving a first tab guide and a second tab guide from above and below of the electrode tabs, respectively, toward the electrode tabs; and elongating at least one of the electrode tabs by horizontally moving at least one of the first tab guide or the second tab guide toward the electrode assembly in a state in which the welding target portion of the electrode tabs is fixed to the welding part.

16. The method of claim 15, further comprising welding the electrode tabs in a state in which the at least one of the electrode tabs is elongated.

\* \* \* \* \*